(12) United States Patent
Castelani et al.

(10) Patent No.: US 10,779,530 B2
(45) Date of Patent: Sep. 22, 2020

(54) SURFACTANT COMPOSITION FOR USE IN GLYPHOSATE-CONTAINING HERBICIDE FORMULATIONS, GLYPHOSATE-CONTAINING HERBICIDE FORMULATION, AND USE OF THE GLYPHOSATE-CONTAINING HERBICIDE FORMULATION

(71) Applicant: OXITENO S.A. INDÚSTRIA E COMÉRCIO, São Paulo-SP (BR)

(72) Inventors: Priscila Castelani, Santo André-SP (BR); Rodrigo Cella, Mauá-SP (BR); Alvim Jorge, São Paulo-SP (BR)

(73) Assignee: OXITENO S.A. INDUSTRIA E COMERCIO, Sao Paulo- SP (BR)

( * ) Notice: Subject to any disclaimer, the term of this patent is extended or adjusted under 35 U.S.C. 154(b) by 7 days.

(21) Appl. No.: 14/440,441

(22) PCT Filed: Sep. 13, 2013

(86) PCT No.: PCT/BR2013/000354
§ 371 (c)(1),
(2) Date: May 4, 2015

(87) PCT Pub. No.: WO2014/071475
PCT Pub. Date: May 15, 2014

(65) Prior Publication Data
US 2015/0272114 A1     Oct. 1, 2015

(30) Foreign Application Priority Data
Nov. 7, 2012  (BR) .......................... 1020120285371

(51) Int. Cl.
*A01N 25/30* (2006.01)
*A01N 57/20* (2006.01)

(52) U.S. Cl.
CPC ............. *A01N 25/30* (2013.01); *A01N 57/20* (2013.01)

(58) Field of Classification Search
CPC .............................. A01N 25/30; A01N 57/20
USPC ......................................................... 504/206
See application file for complete search history.

(56) References Cited

U.S. PATENT DOCUMENTS

| | | |
|---|---|---|
| 3,799,758 A | 3/1974 | Franz |
| 4,012,437 A | 3/1977 | Shachat et al. |
| 5,180,414 A | 1/1993 | Darchy et al. |
| 5,356,861 A | 10/1994 | Gednalski et al. |
| 5,389,598 A | 2/1995 | Berk et al. |
| 5,703,015 A | 12/1997 | Berger et al. |
| 5,750,468 A | 5/1998 | Wright et al. |
| 5,985,794 A | 11/1999 | Hasebe et al. |
| 5,998,332 A | 12/1999 | Sato et al. |
| 2003/0045431 A1 | 3/2003 | Mille et al. |
| 2005/0130842 A1* | 6/2005 | Fleute-Schlachter ........... A01N 25/18 504/206 |
| 2005/0170965 A1* | 8/2005 | Bramati ................. A01N 57/20 504/206 |
| 2006/0040826 A1 | 2/2006 | Eaton et al. |
| 2008/0103047 A1* | 5/2008 | Gioia .................... A01N 57/20 504/206 |
| 2011/0111958 A1 | 5/2011 | Zenon |
| 2012/0172223 A1* | 7/2012 | Wacker ................. A01N 25/10 504/206 |

FOREIGN PATENT DOCUMENTS

| | | | |
|---|---|---|---|
| EP | 0483095 A2 | 4/1992 | |
| WO | 2006/069794 A2 | 7/2006 | |
| WO | 2007045386 A1 | 4/2007 | |
| WO | WO 2007045386 A1 * | 4/2007 | ........... C07C 233/36 |
| WO | 2009/127020 A1 | 10/2009 | |
| WO | 2011/029561 A2 | 3/2011 | |

OTHER PUBLICATIONS

The definition of "including", Merriam-Webster [online]. [retrieved on Oct. 16, 2017]. Retrieved from: http://www.merriam-webster.com/dictionary/include.*
European Search Report issued in corresponding application No. EP 13852507.6 dated Mar. 24, 2016. (7 pages).
International Search Report issued in corresponding application No. PCT/BR2013/000354 dated Oct. 13, 2014.

* cited by examiner

*Primary Examiner* — Johann R Richter
*Assistant Examiner* — Courtney A Brown
(74) *Attorney, Agent, or Firm* — Carter, DeLuca & Farrell LLP

(57) ABSTRACT

A surfactant composition for use in glyphosate-containing herbicide formulations, includes from 5 to 50% by weight of one or more amphoteric surfactants, diluted in solvents derived from the process of synthesis thereof, wherein the surfactants have general formula (I)

$$R^1-(XR^2)_m-N^+(R^3)(R^4)-CH_2-CH(R^5)-COO^- \quad (I)$$

wherein $R^1$ is hydrogen or $C_{1-18}$ hydrocarbyl; each X is independently an ether, thioether, sulfoxide, ester, thioester or amide bond; each $R^2$ is independently a $C_{3-6}$ chain; m is a number from 0 to 8 such that the number of carbon atoms in $R^1-(XR^2)_m$ is from 8 to 24; $R^3$ and $R^4$ are independently hydrogen or $C_{1-4}$ chains; $R^5$ is hydrogen or methyl. The surfactant composition is used to increase the agronomic efficacy of herbicide formulations containing a high concentration of glyphosate salts. Herbicide formulations including the surfactant composition and uses thereof are also provided.

6 Claims, No Drawings

SURFACTANT COMPOSITION FOR USE IN GLYPHOSATE-CONTAINING HERBICIDE FORMULATIONS, GLYPHOSATE-CONTAINING HERBICIDE FORMULATION, AND USE OF THE GLYPHOSATE-CONTAINING HERBICIDE FORMULATION

FIELD OF THE INVENTION

The present invention relates to a surfactant composition comprising at least one amphoteric derivative of the class of amphopropanoates which is used to increase the agronomic efficacy of herbicide formulations containing a high concentration of glyphosate salts. The present invention further describes herbicide formulations comprising such surfactant composition.

BACKGROUND OF THE INVENTION

The need for using herbicide formulations in agriculture is essential to increase crop yield and to ensure the production of food for a growing world population. From among all the herbicides used in agriculture to combat weeds, n-phosphomethylglicine is the most commonly used, which is widely known as glyphosate.

Glyphosate is a non-selective foliar herbicide, that is, once applied on leaves it is absorbed and transferred by the plant serving to inhibit an enzyme involved in the synthesis of aromatic amino acids causing the plant to die. Due to its low toxicity, low waste index, high effectiveness in a broad range of pest species and for being easily obtained and synthesized, glyphosate has rapidly become popular in the market. Introduction of glyphosate in the market under the brand name Roundup® made the adoption of the direct-planting system possible, which consists of directly seeding the soil with no need for previous preparation thereof using heavy equipment, hence saving time. In addition, the development of genetically engineered (GE) soy seeds has further disseminated the use of glyphosate, enabling the application thereof on already emerged crops, causing them to be free of weeds and to be able to achieve full development.

In a typical formulation, glyphosate is in the form of a salt, being neutralized with a base, monoisopropylamine (MIPA), potassium hydroxide (KOH), ammonia ($NH_3$), monoethanolamine (MEA) or mixtures thereof, so as to become water-soluble. In spite of the evident advantages in controlling weeds, the glyphosate molecule has slow absorption, which decreases its agronomic efficacy. In order to solve the problem, document U.S. Pat. No. 3,799,758 included in the glyphosate containing herbicide formulation, a surfactant, which could belong to one of the following groups: alkylbenzene or alkyl naphthalene sulfonates, sulphated fatty alcohols, amines or acid amines, long chain sodium isothionate acid esters, sodium sulfocuccinate esters, sulphated vegetable oils, tertiary acetylenic glycols and ethoxylated alkyl amine. In the original invention (U.S. Pat. No. 3,799,758), surfactants belonging to the group of ethoxylated alkyl amines were preferred in the majority of the formulations due to the high efficiency thereof However, using ethoxylated alkyl amines in glyphosate-containing formulations still imposes a few problems. The first is caused by the compatibility of these surfactants with the different glyphosate salts. For example, it is known that tallow fatty amine with 15 moles of ethylene oxide is compatible with MIPA glyphosate, while such a compatibility does not occur when the glyphosate counter-ion is potassium. In practice, such an incompatibility causes segregation of one of these formulation components, causing phase separation over time.

The phenomenon of phase separation is even more pronounced and more difficult to be overcome in formulations having high glyphosate salt concentrations, which makes it even more difficult to use ethoxylated alkyl amines in these formulations. The use of concentrated formulations is more desirable in terms of sustainability since, among other advantages, it results in savings in packaging and logistic-related costs, as all the packages of defensive agents have to be collected by their manufacturing companies for appropriate disposal. To obtain more concentrated glyphosate-containing formulations, the choice for potassium salt is preferred due to its high density. In contrast, compatibility of this salt with surfactants is quite lower compared to other salts, rendering this formulation less usual in the market. Another salt that is not very common in the market due to having low compatibility with surfactants is ammonium glyphosate, which could be commercially interesting due to the low cost of the ammonia neutralizer, as described in document U.S. Pat. No. 5,998,332.

Another known problem of ethoxylated alkyl amines is their high dermal and eye irritability, and formulations containing them require special care during handling. One approach to overcome this problem is using additives that reduce irritability of said amines, as described in U.S. Pat. No. 5,703,015 and U.S. Pat. No. 5,389,598 which use, respectively, phosphated ethoxylated alkyl phenol and mono and diacids to perform this task. In spite of that, these additives may present incompatibility problems depending on the glyphosate salt. The best way is to substitute ethoxylated alkyl amines with surfactants having low eye irritability in glyphosate-containing formulations, without losing its agronomic efficacy.

Thus, the search for novel surfactants compatible with several glyphosate salts at high concentrations, which ensure its agronomic efficacy and have low eye irritability has been a constant challenge for formulators. Different classes of surfactants have been tested for this application, but the obtained formulation not always has all the desired requirements. Examples of surfactants already used in glyphosate-containing formulations are described elsewhere and include alkylpolyglucosides (U.S. Pat. No. 5,356,861), ethoxylated etheramines (U.S. Pat. No. 5,750,468), hydrophobically modified polyglycerols (WO2011029561), ethoxylated imidazolines (WO2009127020) and phosphated esters (FR9006543). Amphoteric surfactants are known to increase the effectiveness of agrochemical actives, including glyphosate, as described in documents U.S. Pat. No. 5,985,794 and US20060040826. For example, patent application WO2006069794 describes an aqueous herbicide composition containing a glyphosate or glufosinate salt and a surfactant system comprising at least one betaine. Nevertheless, the use of commercial betaines in concentrated glyphosate formulations may exhibit problems due to the precipitation of salts that are by-products of the synthesis of betaine.

It has now been surprisingly noted that trialkyl ammonium propanoates, from the class of amphoteric surfactants, have excellent compatibility not only with MIPA glyphosate salts, but with potassium glyphosate at high concentrations, thereby having advantages over other surfactants. The trialkyl ammonium propanoates also had the advantage of being produced by a process that does not lead to the formation of salts and by-products.

Thus, it is an object of the present invention a new surfactant composition comprising trialkyl ammonium propanoates for use in herbicide formulations containing high concentrations of glyphosate salts. It is another object of this invention a herbicide formulation comprising the surfactant composition. The advantages of this novel composition of this invention will be apparent from the following description.

SUMMARY OF THE INVENTION

The present invention relates to a novel surfactant composition for use in herbicide formulations containing high concentrations of glyphosate salts, as well as herbicide formulations containing a novel surfactant composition. The surfactant composition of the present invention comprises one or more amphoteric surfactants belonging to the class of trialkyl ammonium propanoates and one or more solvents, and can also contain further surfactants. The surfactant composition described herein can be incorporated into herbicide formulations containing glyphosate salts neutralized by different bases, such as MIPA, KOH, ammonia (diammonium glyphosate salt, or di-$NH_4^+$), monoethanolamine (MEA), triethanolamine (TEA) or mixtures thereof. In addition to being compatible with various glyphosate salts at different concentrations, the surfactant composition of the present invention was shown to be capable of improving stability and effectiveness of these formulations.

DETAILED DESCRIPTION OF THE INVENTION

The novel surfactant composition referred to in the present invention comprises one or more amphoteric surfactants diluted into solvents that are either derived or not from the synthesis process thereof, and can also contain further surfactants. The amphoteric surfactants suited for use in the present invention are those having general formula (I):

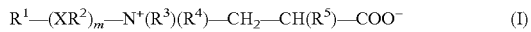

$$R^1-(XR^2)_m-N^+(R^3)(R^4)-CH_2-CH(R^5)-COO^- \quad (I)$$

where:
$R^1$ is hydrogen or $C_{1-18}$ hydrocarbyl,
each X is independently an ether, thioether, sulfoxide, ester, thioester or amide bond,
each $R^2$ is independently a $C_{3-6}$ chain,
m is a number from 0 to 8 such that the number of carbon atoms in $R^1-(XR^2)_m$ is from 8 to 24,
$R^3$ and $R^4$ are independently hydrogens or $C_{1-4}$ chains,
$R^5$ is hydrogen or methyl.

The amphoteric surfactants described above may be obtained by reacting the respective tertiary amines with acrylic or methacrylic acid represented by scheme (II).

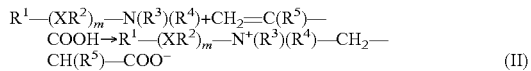

$$R^1-(XR^2)_m-N(R^3)(R^4)+CH_2=C(R^5)-COOH \rightarrow R^1-(XR^2)_m-N^+(R^3)(R^4)-CH_2-CH(R^5)-COO^- \quad (II)$$

This is an already well-established method (US40122437) and variations thereof can be easily found in the literature (*Amphoteric Surfactants*, Eric Lomax (Editor), Marcel Dekker, Volume 59, $2^{nd}$ edition). An advantage of this process resides in obtaining the amphoteric surfactant without forming reaction byproducts of inorganic salts, unlike the commonly practiced industrial process for obtaining betaines. Thus, it is not necessary to perform any additional industrial procedures for removing salts, and amphoteric surfactants can be used in glyphosate-containing herbicide formulations without any precipitation of salts over time, thus increasing the formulation stability. According to the process represented by scheme (II), a tertiary amine is added to an aqueous solution of (meth)acrylic acid partially neutralized with sodium hydroxide to prevent an acid-base reaction from taking place, containing a polymerization inhibitor. The mixture is reacted for 5 hours at 60° C. and the amphoteric surfactant is obtained in water, which can be partially removed by means of a drying process.

Partial removal of water allows for the addition of a solvent to the amphoteric surfactant, such as solvents belonging to the class of glycols, such as glycerin, which serves as a moisturizer and aids in spreading agrochemical formulations (Tann, S. *9th International Symposium on Adjuvants for Agrochemicals*, 2010, ISAA Society).

The surfactant composition of the present invention can further contain other surfactants added by means of simple mixture to the aforementioned amphoteric surfactant. The most common examples are: ethoxylated alkyl ethers, phosphated ethoxylated alkyl ethers, ethoxylated alkyl etheramines, alkylpolyglucosides, ethoxylated alkylpolyglucosides, ethoxylated imidazolines, polysiloxane derivatives, alkyl dimethyl amine oxides, alkyl dimethyl betaines, alkyl amido propyl amines and ethoxylated alkyl amines One of the advantages of the present invention is the ease of compatibilization of amphoteric surfactants having general formula (I) with these other surfactants, since these mixtures of surfactants can lead to a greater increase of the action of glyphosate-containing herbicide formulations due to a synergistic effect between them.

The present invention provides the aforementioned surfactant composition in amounts of from 5 to 50% by weight of the amphoteric surfactant, preferably of from 20 to 40%; 0 to 20 by weight of glycols, preferably from 5 to 15%; 10 to 70% by weight of water, preferably from 50 to 70%; and 0 to 30% of other surfactants, preferably from 0 to 20%.

In a preferred embodiment of the present invention, the surfactant composition comprises 30% of an amphoteric surfactant of general formula (I) wherein $R^1$ is a $C_{8-10}$ straight-chain, X is an amide bond, $R^2$ is a $C_3$ *straight-chain*, m is 1, $R^3$ and $R^4$ are methyl and $R^5$ is hydrogen diluted in 60% water and 10% glycerin.

In another preferred embodiment, the surfactant composition comprises 30% of an amphoteric surfactant of general formula I, wherein $R^1$ is a $C_{12-18}$ straight-chain, m is 0, $R^3$ and $R^4$ are methyl and $R^5$ is hydrogen diluted into 70% water.

In still another preferred embodiment of the present invention, the surfactant composition comprises 30% of an amphoteric surfactant of general formula (I) wherein $R^1$ is a $C_{12-18}$ straight-chain, X is an amide bond, $R^2$ is a $C_3$ straight-chain, m is 1, $R^3$ and $R^4$ are methyl and $R^5$ is hydrogen diluted in 70% water.

In another preferred embodiment of the present invention, the surfactant composition comprises 30% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen diluted in 70% water.

In yet a further preferred embodiment, the surfactant composition comprises 40% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen diluted in 60% water.

In another preferred embodiment, the surfactant composition comprises 24% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen diluted in 56% water and 20% ethoxylated tallow amine as another surfactant.

The novel surfactant compositions described herein are compatible and can be used in glyphosate-containing herbicide formulations. These herbicide formulations can further contain in their composition, in addition to glyphosate, other herbicides from the following chemical classes: 4-(aryloxyphenoxy)alcanoic acid, 2-(4-aryloxyphenoxy)alcanoic acid, 1,3,5-triazine, 1,3,5-triazine-2,4-dione, 2-(aryloxyphenoxy)propionamide, 2,6-dinitroaniline, 2-chloroacetanilide, acetamide, anilide, aromatic acid, arylaminopropionic acid, aryloxycarboxylic acid, aryloxyphenoxypropionic acid, benzamide, benzenedicarboxylic acid, benzimidazole, benzofuran, benzoic acid, benzonitrile, benzothiadiazinone, bipyridylium, carbamate, chloroacetamide, alkanamide, cyclohexanodione oxime, cyclohexenedicarboximide, dinitroaniline, dinitrophenol, diphenyl ether, substituted homoalanine, halogenated alcanoic acid, halogenated aliphatic, hydroxybenzonitrile, imidazolinone, isoxazole, isoxazolidinone, N-phenylphthalimide, organoarsenic, organochloride, organophosphorus, isoxazole, oxadiazole, oxadiazolone, oxyacetamide, phenoxycarboxylic acid, phenyl carbamate, phenylpyrazole, phenylpyridazine, phenylurea, phosphinic acid, phosphoroamidate, phosphorodithioate, phtalamate, pyrazole, pyridazine, piridazinone, pyridin, piridinone, pyridinecarboxyamide, pyridine carboxylic acid, piyridinyloxyalcanoic acid, pyrimidinedione, pyrimidine, pyrimidinyloxybenzoic acid, quinolinecarboxylic acid, thiocarbamate, sulphanilyl carbamate, semicarbazone, sulfonylurea, thiadiazole, triazine, triazinone, triazole, triazolone, triazolinone, triazole carboxamide, triazolopyrimidine, triazolopyrimidine sulfanilide, triketone and uracil, urea and methyl isothiocyanate.

The herbicide formulations referred to by the present invention can comprise glyphosate salts; the surfactant compositions described in the present invention, an antifoaming agent and water. The antifoaming agent, which component is usually based on silicone compounds, has the role of preventing suds formation during manufacture of the formulation and dilution thereof in the liquid spray to be applied to the field.

The herbicide formulations referred to in the present invention comprise of from 300 g/L to 600 g/L in acid equivalents (a.e.) of a glyphosate salt, preferably from 360 to 540 g/L; from 50 to 400 g/L of one or more neutralizing bases, preferably from 70 to 200 g/L; from 50 to 200 g/L of one of the surfactant compositions described in the invention; from 0.5 to 2.0 g/L of an anti-foaming agent, preferably from 1.0 to 1.2 g/L; and water q.s.p. 1 L.

In a preferred embodiment of the present invention, the glyphosate-containing herbicide formulation comprises 360 g/L a.e. glyphosate, neutralized with 140 g/L MIPA, containing 140 g/L of the surfactant composition comprising 24% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen diluted in 56% water and 20% ethoxylated tallowamine as another surfactant, 1.0 g/L of anti-foaming agent and water q.s.p. 1 L.

In another preferred embodiment of the present invention, the glyphosate-containing herbicide formulation comprises 500 g/L a.e. glyphosate, neutralized with 155 g/L KOH, containing 140 g/L of the surfactant composition comprising 30% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen, diluted in 60% water and 10% glycerin, 1.0 g/L of anti-foaming agent and water q.s.p. 1 L.

In still another preferred embodiment of the present invention, the glyphosate containing herbicide formulation comprises 480 g/L a.e. glyphosate, neutralized with 199 g/L MIPA, containing 140 g/L of the surfactant composition comprising 30% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen, diluted in 70% water, 1,0 g/L of anti-foaming agent and water q.s.p. 1 L.

Another preferred embodiment of the present invention consists of the glyphosate containing herbicide formulation comprising 370 g/L a.e. glyphosate, neutralized with 75 g/L $NH_3$, containing 140 g/L of the surfactant composition comprising 30% of an amphoteric surfactant of general formula (I) wherein $R^1$ is a $C_{8-10}$ straight-chain, X is an amide bond, $R^2$ is a $C_3$ straight-chain, m is 1, $R^3$ and $R^4$ are methyl and $R^5$ is hydrogen, diluted in 70% water, 1,0 g/L of anti-foaming agent and water q.s.p. 1 L.

Due to the chemical nature of amphoteric compounds of structure (I), the surfactant compositions of the present invention have several advantages such as for example ease of being directly incorporated into the glyphosate-containing herbicide formulations resulting in low-viscosity and easy to handle formulations. In addition, the glyphosate-containing herbicide formulations prepared with these surfactant compositions have shown to be quite stable, with no precipitation of salts, which is common in formulations containing amphoteric surfactants, being compatible with several glyphosate salts, including high concentrations of potassium. The surfactant compositions were also shown to be compatible and stable with MEA salts and TEA and MEA mixed salts at high concentrations and with diammonium salts. Thus, the surfactant composition described herein provides the formulator with versatility when choosing the glyphosate salt at high concentrations, which fact is uncommon for most of the surfactants used in glyphosate-containing herbicide formulations. Another advantage of using the new surfactant composition in glyphosate-containing herbicide formulations refers to the agronomic efficacy performance, which is quite pronounced and the low toxicity and eye irritability.

To assess stability of a glyphosate containing herbicide formulation, the cloud point (CP) can be measured. More stable formulations tend to have higher cloud point (become cloudy at higher temperatures) than less stable formulations. It is common sense that the cloud point of a stable glyphosate-containing herbicide formulation should be higher than 60° C. (Nandula, V. (Ed.) *Glyphosate Resistance in Crops and Weeds*, 2010, 1st edition, John Wiley and Sons, New Jersey, USA). In the instant invention, the glyphosate-containing herbicide formulations obtained with the surfactant compositions had high cloud points and good stability in shelf-life tests at different temperatures carried out for a period of three months, as described in the examples, which are not intended to limit the invention (tables 1 and 2).

TABLE 1

Examples of surfactant compositions of the invention

| | Example (% by weight) | | | | |
|---|---|---|---|---|---|
| Component | 1 | 2 | 3 | 4 | 5 |
| Amphoteric | | | | | |
| $C_{8-10}$—(C=O)—NH— $C_3H_6$—$N^+(CH_3)_2$—$CH_2$—$CH_2$—$COO^-$ | 30% | — | — | 30% | 40% |
| $C_{12-18}$—$N^+(CH_3)_2$—$CH_2$—$CH_2$—$COO^-$ | — | 30% | — | — | — |
| $C_{12-18}$—(C=O)—NH—$C_3H_6$— $N^+(CH_3)_2$—$CH_2$—$CH_2$—$COO^-$ | — | — | 30% | — | — |
| Solvent | | | | | |
| Water | 60% | 70% | 70% | 70% | 60% |
| Glycerin | 10% | — | — | — | — |

TABLE 2

Examples of glyphosate-containing herbicide formulations
containing the surfactants of the invention

| Glyphosate salt | Conc. (g/L a.e.) | Composition Surfactant | CP (° C.) | Appearance after 3 months at 54° C. |
|---|---|---|---|---|
| K | 500 | Example 1 | >100 | Clear, amber |
| di-NH4+ | 370 | Example 1 | >95 | Clear, yellowish |
| TEA/MEA* | 480 | Example 1 | >100 | Clear, amber |
| MEA | 480 | Example 1 | >100 | Clear, amber |
| MIPA | 360 | Example 2 | >100 | Clear, yellowish |
| MIPA | 480 | Example 2 | >100 | Clear, amber |
| K | 500 | Example 2 | >100 | Clear, amber |
| di-NH4+ | 370 | Example 2 | >95 | Clear, yellowish |
| TEA/MEA* | 480 | Example 2 | >97 | Clear, amber |
| MEA | 480 | Example 2 | >100 | Clear, amber |
| MIPA | 360 | Example 3 | 87 | Clear, yellowish |
| K | 500 | Example 3 | >100 | Clear, amber |
| MEA | 480 | Example 3 | >100 | Clear, amber |
| MIPA | 360 | Example 4 | 83 | Clear, yellowish |
| MIPA | 480 | Example 4 | >100 | Clear, yellowish |
| K | 500 | Example 4 | >100 | Clear, amber |
| di-NH4+ | 370 | Example 4 | >95 | Clear, yellowish |
| TEA/MEA* | 480 | Example 4 | >100 | Clear, amber |
| MIPA | 360 | Example 5 | 87 | Clear, yellowish |
| K | 500 | Example 5 | >100 | Clear, amber |
| di-NH4+ | 370 | Example 5 | >100 | Clear, yellowish |
| TEA/MEA* | 480 | Example 5 | >100 | Clear, amber |
| MEA | 480 | Example 5 | >100 | Clear, amber |

*mixed salt of glyphosate, neutralized with 60% TEA/40% MEA by mass.

The invention claimed is:

1. A glyphosate-containing herbicide formulation, comprising:
   (a) glyphosate salts, selected from the group consisting of MIPA, potassium, MEA, TEA, diammonium or mixtures thereof;
   (b) an amphoteric surfactant composition wherein:
      the amphoteric surfactant within the composition is from 5 to 50% by weight, diluted in solvents derived from a process of synthesis thereof, wherein the amphoteric surfactants have the general formula (I)

$R^1-(XR^2)_m-N^+(R^3)(R^4)-CH_2-CH(R^5)-COO^-$  (I)

where
   $R^1$ is $C_{8-18}$ hydrocarbyl,
   each X is independently an amide bond,
   each $R^2$ is independently a $C_{3-6}$ chain,
   m is a number from 0 to 8 such that the number of carbon atoms in $R^1-(XR^2)_m$ is from 8 to 24,
   $R^3$ and $R^4$ are independently hydrogens or $C_{1-4}$ chains, and
   $R^5$ is hydrogen or methyl; and
   (c) water,
   wherein the cloud point of the formulation is greater than 100.

2. The glyphosate-containing herbicide formulation of claim 1, further comprising an antifoaming agent.

3. The glyphosate-containing herbicide formulation of claim 1, further comprising:
   from 50 to 400 g/L of a neutralizing base;
   from 0.5 to 2.0 g/L of the anti-foaming agent;
   and wherein,
   the glyphosate is from 300 g/L to 600 g/L in acidic equivalents (a.e.);
   the surfactant composition is from 50 to 200 g/L; and
   water q.s.p. 1 .

4. The glyphosate-containing herbicide formulation of claim 1, further comprising:
   from 70 to 200 g/L of a neutralizing base;
   from 1.0 to 1.2 g/L of the anti-foaming agent; and wherein
   the glyphosate is from 360 g/L to 540 g/L in acidic equivalents (a.e.); and
   water q.s.p. 1 L.

5. A liquid spray for controlling weeds comprising the glyphosate-containing herbicide formulation of claim 1.

6. A glyphosate-containing herbicide formulation, comprising:
   (a) glyphosate salts, selected from the group consisting of MIPA, potassium, MEA, TEA, diammonium or mixtures thereof;
   (b) an amphoteric surfactant composition wherein:
      the amphoteric surfactant within the composition is from 5 to 50% by weight of one or more amphoteric surfactants, diluted in solvents derived from a process of synthesis thereof, wherein the amphoteric surfactants have the general formula (I)

$R^1-(XR^2)_m-N^+(R^3)(R^4)-CH_2-CH(R^5)-COO^-$  (I)

where
   $R^1$ is $C_{8-18}$ hydrocarbyl,
   each X is independently an amide bond,
   each $R^2$ is independently a $C_{3-6}$ chain,
   m is a number from 0 to 8 such that the number of carbon atoms in $R^1-(XR^2)_m$ is from 8 to 24,
   $R^3$ and $R^4$ are independently hydrogens or $C_{1-4}$ chains, and
   $R^5$ is hydrogen or methyl; and
   water,
   wherein the composition comprises from 300 g/L to 600 g/L in acidic equivalents (a.e.) of glyphosate and from 50 to 200 g/L of the surfactant composition, and
   wherein the cloud point of the formulation is greater than 100.

* * * * *